US008108668B2

(12) United States Patent
Rozas

(10) Patent No.: US 8,108,668 B2
(45) Date of Patent: Jan. 31, 2012

(54) ASSOCIATING A MULTI-CONTEXT TRUSTED PLATFORM MODULE WITH DISTRIBUTED PLATFORMS

(75) Inventor: Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1021 days.

(21) Appl. No.: 11/474,778

(22) Filed: Jun. 26, 2006

(65) Prior Publication Data
US 2007/0300069 A1 Dec. 27, 2007

(51) Int. Cl.
H04L 9/00 (2006.01)
(52) U.S. Cl. ........................................................ 713/155
(58) Field of Classification Search .................. 713/155, 713/156, 157, 158; 380/277
See application file for complete search history.

(56) References Cited

U.S. PATENT DOCUMENTS

| 7,058,807 | B2 * | 6/2006 | Grawrock et al. ............ 713/172 |
| 7,076,655 | B2 | 7/2006 | Griffin |
| 7,222,062 | B2 | 5/2007 | Goud |
| 7,380,119 | B2 | 5/2008 | Bade |
| 7,454,544 | B2 * | 11/2008 | Bond et al. ...................... 710/64 |
| 7,512,815 | B1 * | 3/2009 | Munetoh ........................ 713/193 |
| 7,552,419 | B2 * | 6/2009 | Zimmer et al. ................ 717/121 |
| 2002/0169717 | A1 | 11/2002 | Challener |
| 2002/0193615 | A1 | 12/2002 | Aksela |
| 2002/0194482 | A1 | 12/2002 | Griffin |
| 2003/0115453 | A1 | 6/2003 | Grawrock |
| 2003/0115468 | A1 * | 6/2003 | Aull et al. ...................... 713/175 |
| 2003/0226031 | A1 | 12/2003 | Proudler |
| 2004/0031030 | A1 * | 2/2004 | Kidder et al. ................. 717/172 |
| 2004/0264797 | A1 | 12/2004 | Lippincott |
| 2005/0086509 | A1 | 4/2005 | Ranganathan |
| 2005/0130611 | A1 * | 6/2005 | Lu et al. ........................ 455/130 |
| 2005/0132122 | A1 | 6/2005 | Rozas |
| 2005/0133582 | A1 * | 6/2005 | Bajikar ........................... 235/10 |
| 2005/0138370 | A1 * | 6/2005 | Goud et al. .................... 713/164 |
| 2005/0144440 | A1 * | 6/2005 | Catherman et al. ........... 713/156 |
| 2005/0166024 | A1 * | 7/2005 | Angelo et al. ................. 711/164 |
| 2005/0246552 | A1 * | 11/2005 | Bade et al. .................... 713/193 |
| 2005/0286792 | A1 | 12/2005 | Tadas |
| 2006/0002471 | A1 | 1/2006 | Lippincott |

(Continued)

FOREIGN PATENT DOCUMENTS
WO 0206929 A2 1/2002

OTHER PUBLICATIONS

U.S. Appl. No. 11/171,134, filed Jun. 29, 2005, entitled "Method and Apparatus for Migrating Software-Based Security Coprocessors" by Vincent R. Scarlata, Carlos V. Rozas.

(Continued)

Primary Examiner — Beemnet Dada
Assistant Examiner — Sayed Beheshti Shirazi
(74) Attorney, Agent, or Firm — Trop, Pruner & Hu, P.C.

(57) ABSTRACT

In one embodiment, the present invention includes a method for creating an instance of a virtual trusted platform module (TPM) in a central platform and associating the instance with a managed platform coupled to the central platform. Multiple such vTPM's may be instantiated, each associated with a different managed platform coupled to the central platform. The instances may all be maintained on the central platform, improving security. Other embodiments are described and claimed.

23 Claims, 5 Drawing Sheets

U.S. PATENT DOCUMENTS

| | | | |
|---|---|---|---|
| 2006/0020781 A1* | 1/2006 | Scarlata et al. | 713/100 |
| 2006/0026422 A1 | 2/2006 | Bade | |
| 2006/0031436 A1* | 2/2006 | Sakata et al. | 709/221 |
| 2006/0075223 A1 | 4/2006 | Bade et al. | |
| 2006/0140501 A1 | 6/2006 | Tadas | |
| 2006/0190986 A1* | 8/2006 | Mont et al. | 726/1 |
| 2006/0212939 A1 | 9/2006 | England | |
| 2006/0230401 A1 | 10/2006 | Grawrock | |
| 2006/0256105 A1* | 11/2006 | Scarlata et al. | 345/418 |
| 2006/0256106 A1 | 11/2006 | Scarlata | |
| 2006/0256107 A1* | 11/2006 | Scarlata et al. | 345/418 |
| 2006/0256108 A1* | 11/2006 | Scaralata | 345/418 |
| 2007/0043896 A1 | 2/2007 | Daruwala | |
| 2007/0094719 A1* | 4/2007 | Scarlata | 726/9 |
| 2007/0226786 A1* | 9/2007 | Berger et al. | 726/9 |
| 2007/0256125 A1* | 11/2007 | Chen et al. | 726/18 |
| 2008/0282348 A1 | 11/2008 | Proudler et al. | |
| 2009/0169012 A1* | 7/2009 | Smith et al. | 380/277 |

OTHER PUBLICATIONS

U.S. Appl. No. 12/563,212, field Sep. 21, 2009, entitled "Method and Apparatus for Remotely Provisioning Software-Based Security Coprocessors," by Vincent R. Scarlata.
U.S. Patent and Trademark Office, Office Action dated Mar. 10, 2010 with Reply filed Jun. 9, 2010, in U.S. Appl. No. 11/513,989.
Garfinkel, et al., "Terra, A Virtual Machine-Based Platform for Trusted Computing," 2003, pp. 1-14.
Kuhlmann, et al, "An Open Trusted Computing Architecture—Secure Virtual Machines Enabling User-Define Policy Enforcement," Aug. 2006, pp. 1-16.
Tan, et al., "Certificates for Mobile Code Security," 2002, pp. 1-6.
Petroni, et al., "Copilot—A Coprocessor-based Kernel Runtime Integrity Monitor," Aug. 9-13, 2004, 17 pages.
Strasser, "A Software-Based TPM Emulator for Linux," Jul. 2004, 52 pages.
Sailer, et al., "Design and Implementation of a TCG-based Integrity Measurements Architecture," Aug. 9-13, 2004, 20 pages.
Marchesini, et al., "Experimenting with TCPA/TCG Hardware, or: How I Learned to Stop Worrying and Love the Bear," Dec. 15, 2003, 22 pages.
Powell, et al., "Foundations for Trusted Computing," Nov. 7, 2002, 87 pages.
IEEE Xplore, "Building the IBM 4758 Secure Coprocessor," 2005, 1 page.
Swift, et al., "Improving the Reliability of Commodity Operating Systems," Aug. 9-13, 2004, 18 pages.
Intel Corp., "Intel Trusted Execution Technology," Nov. 2006, 104 pages.
Dunlap, et al., "ReVirt: Enabl/ing Instrusion Analysis through Virtual-Machine Logging and Replay," Proceedings of the 2002 Symposium on OSDI, University of Michigan, 14 pages.
Fraser, et al., "Safe Hardware Access with the Xen Virtual Machine Monitor," 2004, 12 pages.
Meushaw, et al., "NetTop—Commercial Technology in High Assurance Applications," Fall 2000, vol. 9, Edition 4, 12 pages.
Garfinkel, et al, "TERRA—A Virtual Machine-Based Platform for Trusted Computing," Nov. 10, 2004, 26 pages.
Grawrock, et al., "The Intel Safer Computing Initiative," Jan. 2006, 282 pages.
Safford, "The Need for TCPA," IBM Research, Oct. 2002, 10 pages.
Sumrall, et al., "Trusted Computing Group (TCG) and the TPM 1.2 Specification," Intel Developer Forum, 32 pages.
Trusted Computing Group, "What is the Trusted Computing Group," 2005, (internet home page), 2 pages.
Trusted Computing Platform Alliance (TCPA) Main Specification, Version 1.1b, Trusted Computing Group, 2003, 332 pages.
Applied Data Security Group, "Trusted GRUB," 3 pages.
VMWARE, "VMware Reinvents Enterprise Desktop Management and Security with Breakthrough New Product," 4 pages.
Garfinkle, "TERRA—A Virtual Machine-Based Platform for Trusted Computing," SOSP 2003, Oct. 19-22, 2003, 16 pages.
Barham, et al., "Xen and the Art of Virtualization," SOSP 2003, Oct. 19-22, 2003, 16 pages.
TPM Main, Part 1 Design Principles, Specification Version 1.2, Mar. 29, 2006, Part 37: Certified Migration Key Type (pp. 1-12, 168-170).
Berger, "vTPM: Virtualizing the Trusted Platform Module," 2006, 16 pages.
Sadeghi, et al, "Property-Based Attestation for Computing Platforms: Caring about Properties, not mechanisms," 12 pages.
U.S. Patent and Trademark Office, Final Office Action mailed Aug. 13, 2010 and RCE filed Nov. 11, 2010 in U.S. Appl. No. 11/512,989.
U.S. Patent and Trademark Office, Office Action mailed Aug. 31, 2010 with Reply filed Nov. 22, 2010 in U.S. Appl. No. 12/563,212.
U.S. Patent and Trademark, Office Action mailed Mar. 21, 2011 with Reply filed Jun. 23, 2011 in U.S. Appl. No. 11/512,989.
U.S. Patent and Trademark Office, Notice of Allowance mailed Jul. 6, 2011 in U.S. Appl. No. 12/563,212.
U.S. Patent and Trademark Office, Notice of Allowance mailed Mar. 22, 2011 with Request for Continued Examination (RCE) filed Jun. 21, 2011 in U.S. Appl. No. 12/563,212.
U.S. Patent and Trademark Office, Notice of Allowance Mailed Sep. 1, 2011 in U.S. Appl. No. 11/512,989.
Ulrich Kuhn, et al., "Secure Data Management in Trusted Computing," Aug. 29-Sep. 1, 2005, 15 pages.

* cited by examiner

US 8,108,668 B2

ASSOCIATING A MULTI-CONTEXT TRUSTED PLATFORM MODULE WITH DISTRIBUTED PLATFORMS

BACKGROUND

Embodiments of the present invention relate to processing systems, and more particularly to such systems including security features.

Modern computer systems include various resources including one or more processors, memory, chipset components, input/output (I/O) devices and the like. These components interact to process data. Oftentimes, a computer is interconnected with other systems, e.g., via a local network or a global network. Due to the interactions between computers, security can be compromised.

Accordingly, various features have been introduced to improve security of computer systems. For example, in addition to memory and one or more processors, a system may include a trusted platform module (TPM). A TPM is a hardware component that resides within a system and provides various facilities and services for enhancing security. For example, a TPM may be used to protect data and to attest the configuration of a platform. The sub-components of a TPM may include an execution engine and secure non-volatile (NV) memory or storage. The secure NV memory is used to store sensitive information, such as encryption keys, and the execution engine protects the sensitive information according to the security policies to be implemented by the TPM. A TPM may be implemented in accordance with specifications such as the Trusted Computing Group (TCG) TPM Specification Version 1.2, dated Oct. 2, 2003 (the "TPM specification").

In general, a TCG-compliant TPM provides security services such as attesting to the identity and/or integrity of a platform, based on characteristics of the platform. Platform characteristics including hardware components of the platform, such as the processor(s) and chipset, can be communicated to the TPM through a platform endorsement credential provided by an authority (e.g., an original equipment manufacturer (OEM)). A TPM may also support auditing and logging of software processes, as well as verification of platform boot integrity, file integrity, and software licensing of firmware and an operating system (OS), for example. A TPM thus provides a root of trust for a platform.

Typically, a TPM is closely configured with its system. That is, the TPM generally is affixed to the system to provide adequate root of trust. In many different networks environments, particularly in managed networks, a central server can act to control operations of servers or other devices connected thereto, such as network servers, data servers, e-mail servers and the like. While the central server provides control over such managed resources, typically the managed resources include their own independent hardware and software. Furthermore, to the extent that such networked systems include TPM resources, they are dedicated to and located on their dedicated system. Such configuration, while improving security, prevents migration of TPM services across the systems and furthermore requires the complexity and expense of separate and independent TPM resources for each system.

DETAILED DESCRIPTION

In various embodiments, a system may be configured to provide security services such as those afforded by a trusted platform module (TPM). That is, a single system such as a management platform e.g., a central server may include hardware, software, firmware or combinations thereof to enable security services for multiple platforms (such as managed platforms) coupled thereto. More particularly, the secure services may remain at all times on the management system, improving security while enabling use of secure services by the managed platforms coupled thereto. The security services may be implemented in one or more hardware devices to provide software support to enable a multi-context device to be used by a set of distributed systems, and more particularly by virtualized resources such as virtual machines (VMs) of the distributed platforms.

Virtualization permits partitioning of a system into multiple virtual machines. For instance, hardware resources may be partitioned in a way that allows multiple OSs to execute on the same machine concurrently. Specifically, each OS may run in a different VM. Each VM may therefore be considered a substantially independent software environment. An OS running in a VM may be referred to as a guest OS. The VMs may be run on top of a run-time OS such as an embedded OS.

Figure 1:
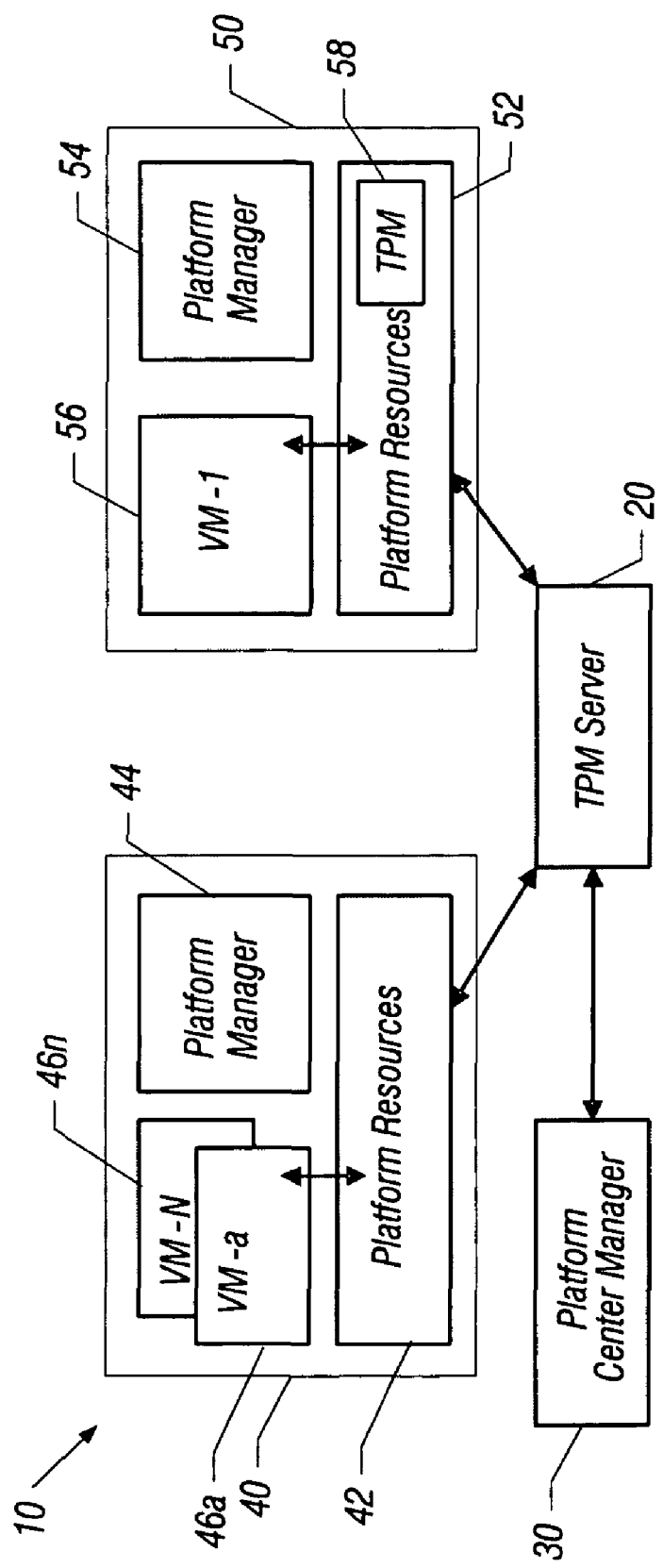
FIG. 1 is a block diagram of a system in accordance with one embodiment of the present invention.

Referring now to FIG. 1, shown is a block diagram of a system in accordance with one embodiment of the present invention. As shown in FIG. 1, system 10 may be a network such as an enterprise server environment. Such environments may take the form of a server farm, data center, blade server system or the like. In yet other embodiments, system 10 may correspond to a distributed computing environment. In various implementations, to provide secure processing via TPM-based activities or other such secure processing, a centralized location of system 10 may be responsible for implementing secure operations for the platforms within the system. Thus as shown in FIG. 1, a management device such as a centralized manager device, i.e., a TPM server 20 may be present. TPM server 20 may include TPM hardware. For example in one embodiment, TPM server 20 may include one or more security coprocessors (SCs). An SC may be implemented as an integrated circuit (IC) or semiconductor chip, and may be used to protect data and to attest to the configuration of a platform. The SC may be an embedded device such as a TPM that resides on a system motherboard or backplane of TPM server 20. Such devices may include storage facilities, including volatile platform configuration registers (PCRs) and authorization sessions, as well as persistent data integrity registers (DIRs), authorization digests, and general-use persistent storage. Each of these facilities may have a corresponding in-memory data structure. The TPMs or other security resources may act as a multi-context TPM to enable use with distributed resources (e.g., managed platforms) coupled to TPM server 20.

Furthermore, as will be described herein TPM server 20 may maintain instances of virtual TPM's for managed resources within system 10. A virtual TPM (vTPM) is a logical device that provides TPM-like functionality. In one embodiment, TPM server 20 may implement a small, secure run-time targeted to smartcards or embedded systems. In one example embodiment, TPM server 20 may use a mimimally configured LINUX™ version as the run-time environment.

In one embodiment, each vTPM instance may have its own TPM structures, including, for example, an endorsement key (EK), a storage root key (SRK), a user key hierarchy, platform configuration registers (PCRs), monotonic counters, internal persistent storage, data integrity registers (DIRs), and so forth. A vTPM may create keys with single-purpose types for different operations. For example, the key of type EK may only be available for decrypting identity credentials from a privacy certification authority (CA). Attestation identity keys (AIKs) may be used to sign other keys and to quote PCRs. Storage keys (SKs) may be used to protect other keys or to seal data. Binding keys (BKs) may be used to encrypt arbitrary data, and to convert data into a TPM-bound data structure. Signing keys (SigKs) may be used for signing arbitrary data.

The virtual keys and other structures or objects within a vTPM may have the same structure as hardware TPM keys or objects, but the virtual objects within a virtual TPM are not mere references to the standard objects within TPM, such as EKs, SRKs, and PCRs. Instead, each virtual TPM instance may have its own distinct objects, such as a virtual EK (vEK), a virtual SRK (vSRK), virtual PCRs (vPCRs), and virtual DIRs (vDIRs). These virtual objects may be based on or derived from the objects of the hardware TPM. For example, in one embodiment the virtual SRKs and virtual EKs may be children of a hardware SRK or, in the case of nested vTPMs, a virtual SRK may ultimately be based on the hardware SRK. By allowing for vTPM keys to be rooted in vSRKs, this model allows for vTPM nesting. Virtual TPM objects such as vEKs, vSRKs, and vPCRs may in turn serve as the basis for additional virtual objects within a vTPM, such as virtual signing keys (vSigs), virtual AIKs (vAIKs), and virtual storage/encryption keys (vEncs). In one embodiment, each vTPM may provide all of the functions provided by a hardware TPM (hwTPM), with the same application program interfaces (APIs).

By providing a TPM or other security hardware and virtualization of such resources, TPM server 20 may act as a central repository of TPM or other such security services for a set of managed platforms. In such implementations, TPM server 20 may perform creation, persisting, migrating, and destroying instances of virtual TPM's and making such instances available to various managed platforms of the system.

Still referring to FIG. 1, TPM server 20 (also referred to herein as a central server) may operate under control of a platform center manager 30, which may be a separate server or may be a component of central server 20. It is to be understood that in various embodiments, central server 20 and platform center manager 30 may take different forms, including separate servers, blades of a blade server, or components of another server-based system.

Multiple managed platforms may be present in system 10. For purposes of illustration FIG. 1 shows a first managed platform 40 and a second managed platform 50. These managed platforms may be servers, such as stand alone servers, blade servers or other components of system 10. As shown in FIG. 1, first platform 40 may include underlying platform resources 42 such as various hardware of the system including, for example, at least one processor, one or more chipsets, memories such as a dynamic random access memory (DRAM) and other such components. To provide virtualization of these resources, a platform manager 44 may be present. In the example embodiment, platform manager 44 may implement virtualization of platform resources 42 to enable multiple virtualization contexts to be present. For example, as shown in FIG. 1 multiple virtual machines $46_a$-$46_n$ (generically virtual machine 46) may be present, each running its own independent guest OS, and its own independent trusted software stack or TCG software stack (TSS). Such virtual machines may perform various activities using the underlying platform resources 42 in a virtualized manner. That is, virtual machines 46 may execute operations believing they have access to the full range of platform resources 42. Alternately, platform manager 44 may partition the platform to enable multiple execution contexts. In partitioned systems, resources such as processors, memory and I/O devices are not virtualized but instead are assigned to particular guests.

Note that the managed resources of system 10 may take various forms. Thus as shown in FIG. 1, second managed platform 50 may include platform resources 52 that may be different than platform resources 42 of first managed platform 40. For example, platform resources 52 may include a hardware TPM 58. TPM 58 may be used to perform at least certain secure operations within second managed platform 50. For example, TPM 58 may be a minimal TPM to enable certain secure operations such as hashing, attestation and the like, to be used in order to attest second managed platform 50 to TPM server 20. After attestation, TPM server 20 may provide virtual TPM services to second managed platform 50. As shown in FIG. 1, second managed platform 50 further includes a virtual machine 56 that may be instantiated under control of a platform manager 54. While shown with this particular implementation in the embodiment of FIG. 1, it is to be understood that the scope of the present invention is not limited in this regard.

By virtue of TPM server 20, TPM services including hardware TPM processing, as well as the instantiation and use of virtual TPM's may remain on TPM server 20. In this way, security may be improved as the TPM instances do not leave the confines of TPM server 20. Embodiments of the present invention may use TPM server 20 to protect virtual keys and related data, as the vTPM key hierarchies and related data are protected within TPM server 20. For example, the virtual TPM keys may be stored in and never released from TPM server 20, unless the data is first encrypted by an associated vTPM. Consequently, if a virtual TPM is compromised, the public portions of the associated vTPM keys may possibly be subject to unauthorized use, but only for the duration of the compromise. That is, in the embodiment of FIG. 1, all keys remain inside TPM server 20, and thus the private keys are not accessible to the managed platforms such that the keys remain private. Still further, more effective audit key usage may be realized in TPM server 20 to determine what keys where potentially used in an unauthorized manner.

Furthermore, migration of vTPM's may be simplified, as a set of authorized platforms are centralized, in addition to vTPM's. In this way, a virtual TPM may be migrated from, e.g., first managed platform 40 to second managed platform 50 without any re-authentication activities, such as re-keying or other authentication processes. Instead, vTPM migration may be implemented via a logical binding of the vTPM from first managed platform 40 to second managed platform 50. Accordingly, a system in accordance with an embodiment of the present invention can project multiple virtual TPM instances in a single centralized location to support multiple managed platforms or other such resources. In this way, distributed systems can benefit from secure virtualization techniques.

Figure 2:
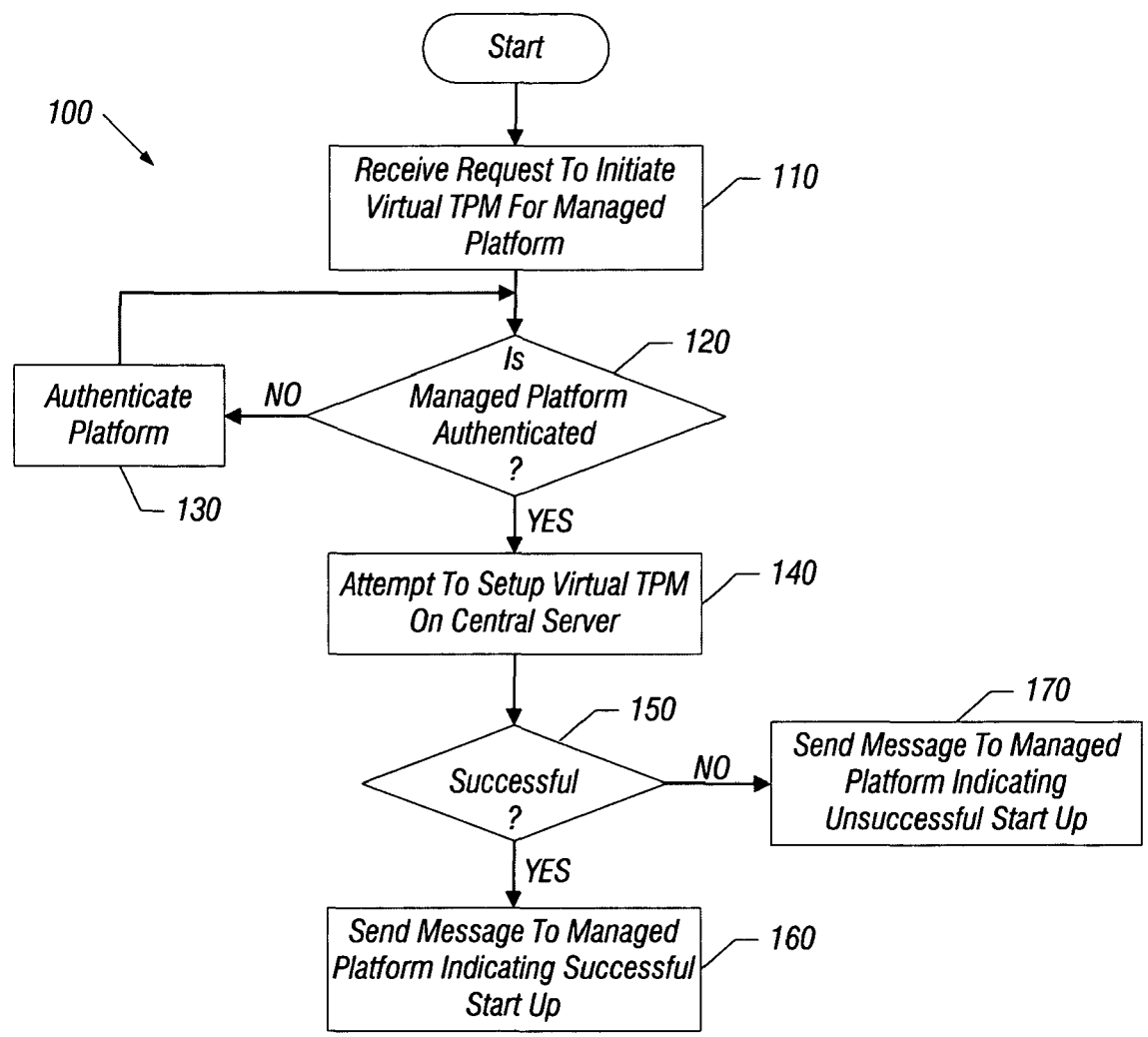
FIG. 2 is a flow diagram of a method in accordance with one embodiment of the present invention.

Referring now to FIG. 2, shown is a flow diagram of a method in accordance with one embodiment of the present invention. Specifically, FIG. 2 shows a method 100 for initializing a vTPM. As shown in FIG. 2, method 100 may begin by receiving a request to initiate a virtual TPM for a managed platform (block 110). Such a request may be sent after a managed platform has initiated its startup mechanisms and desires to be able to execute one or more secure operations. In one embodiment, the request may be received by a central repository, e.g., a TPM server. Still referring to FIG. 2, next it may be determined whether the managed platform is authenticated (diamond 120). That is, the TPM server may determine whether the managed platform has already been authenticated, e.g., by checking an authentication table or in another such manner. Note that authentication may occur at different times. For example, authentication of a managed platform by the central server can take place well prior to the managed platform's request for virtualization support by the central server.

Still referring to FIG. 2, if the managed platform has not been authenticated previously, control passes to block 130, where the platform may be authenticated (block 130). Authentication of the platform by a TPM server may be performed in various manners. For example, in one embodiment a platform may be authenticated via a platform interconnect between the platform and the TPM server. That is, a physical interconnect that couples the platform and TPM server may be used to confirm authentication. In other embodiments, the platform may contain a TPM that can be used to authenticate the platform to the TPM server where the physical interconnect does not include authentication abilities. For example, authentication may be performed by receiving at the central server an authentication message constructed by the managed platform. The central server may authenticate the platform authentication message and establish a local authentication context for the managed platform. Further, the central server may construct and send a reply message to the platform. The reply message may enable the platform to authenticate the central server and allow the platform and central server to communicate securely. The platform may authenticate the reply message and compute a shared key. This shared key may be used in further communications with the central server to identify the source of such communications and authenticate that the communications are from a trusted source.

In yet other implementations, the TPM server may evaluate a configuration of an underlying virtualization manager such as a virtual machine monitor (VMM), platform manager or other virtualization controller of the managed platform. In such an implementation, the TPM server may evaluate this configuration against a security policy. Based on this information, a range of TPM instances (or services) that can be made available to the platform may be restricted. Of course, in other implementations still further authentication processes, such as an authentication based on a Kerberos or other authentication protocol may be used. From block 130 control passes back to diamond 120, discussed above.

If the managed platform is authenticated, control passes from diamond 120 to block 140. There a virtual TPM may be attempted to be set up on the central server (block 140). That is, a virtual TPM instance may be initiated and associated with the requesting managed platform. Various processes may be implemented in initializing a virtual TPM and associating the instance with a corresponding managed platform. The virtual TPM may be requested from platform center manager 30. However, this right may be delegated. For example, in one implementation the requesting platform may send a request for the vTPM along with additional information. Such information may include data structures for an associated VM of the managed platform. Still further, the information may include measurements made on the virtual machine (e.g., configuration, state, and the like). Upon receipt of this information, the central server may determine the sender of the command, authenticate the information sent, and determine whether the sender is authorized to issue the request (i.e., to establish a vTPM). If so, the central server may instantiate an instance of a vTPM to be associated with the requesting platform. Various operations may be performed in TPM server 20 to initialize virtual TPMs. For example, TPM server 20 may create an active instance of an AIK such as a certifying key (CK) and load (at least some of) the state of the virtual TPM instance into active memory. TPM server 20 may subsequently use the CK when certifying virtual endorsements keys. TPM server 20 may further create an active instance of an AIK called a binding key (BK). The BK may be used later to protect vTPM data when that data is released from TPM server 20.

Still referring to FIG. 2, it next may be determined whether the set up attempt for the vTPM was successful (diamond 150). If so, control passes to block 160, where a message is sent to the managed platform indicating successful start up. Assuming that the set up was successful, the managed platform may begin to request services from the vTPM by sending requests along to the central server for handling by the vTPM. Alternately, control passes to block 170, where a failure message can be sent to the managed platform to indicate that the attempt to set up the virtual TPM was not successful.

Figure 3:
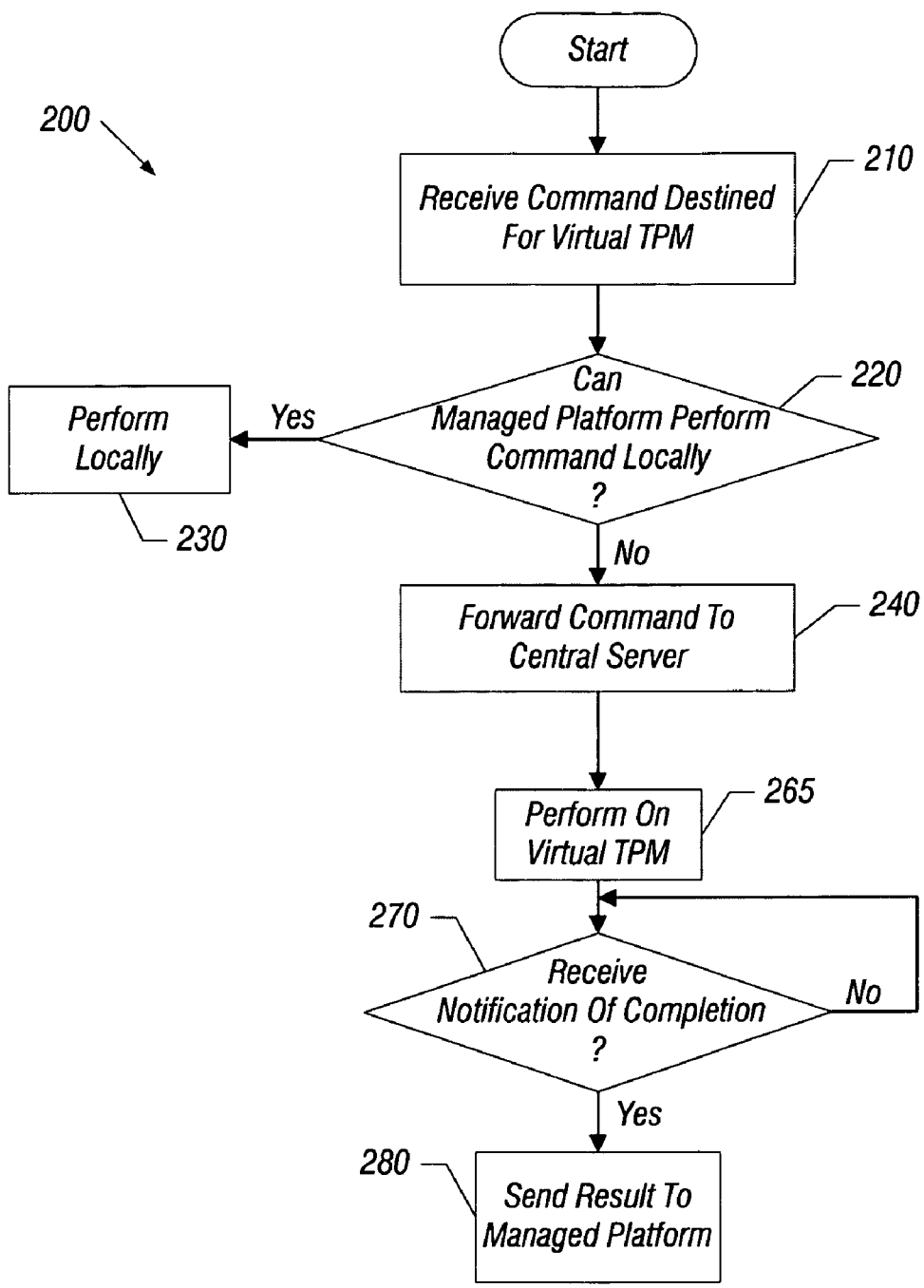
FIG. 3 is a flow diagram of a method of performing security requests of a platform in accordance with an embodiment of the present invention.

Referring now to FIG. 3, shown is a flow diagram of a method of performing security requests of a platform in accordance with an embodiment of the present invention. As shown in FIG. 3, method 200 may begin by receiving a command destined for a virtual TPM (block 210). In the context of a managed resource, the underlying platform may receive this request for a secure function from a VM running on platform resources. While the scope of the present invention is not limited in this regard, such secure function may be as simple as a hashing function or may be a more complex security operation such as key generation, decryption/encryption, and signing.

Control passes from block 210 to diamond 220. There, it may be determined whether the managed platform can perform the request locally (diamond 220). In various implementations, underlying platform resources of a managed platform may have the ability to perform some secure operations on the underlying hardware, either generalized resources such as a central processor or the like, or other more specialized hardware such as a security coprocessor. These operations may be hashing functions or other more basic types of secure operations. If sufficient resources (and/or availability of these resources) are present in the managed platform, the requested operation of the command may be performed locally (block 230). That is, the requested function may be performed on underlying resources of the managed platform and the result communicated back to the initiating virtual machine.

Still referring to FIG. 3, if instead the managed platform cannot perform the command locally, control passes from diamond 220 to block 240. There, the command may be forwarded to a central server (block 240). This central server may correspond to TPM server 20 of FIG. 1. Thus the managed platform forwards the request associated with the command to the TPM server. The TPM server may return an appropriate message to the managed platform. For example, a status message, such as a data not ready message, a busy message or other message may be sent.

Control passes from block 240 to block 265. Thus the requested operation may be forwarded to the virtual TPM. When forwarded to the virtual TPM, the TPM may perform the request accordingly (block 265). That is, the vTPM instance associated with the requesting managed platform may receive the request and perform the requested activity, e.g., a more involved security operation. Note that in some implementations, the vTPM instance may make a request for underlying hardware resources of the TPM server to handle the secure operation.

Different manners of handling communication of results of the operation back to the requesting managed resource can be realized. For example, an interrupt-based mechanism may be implemented to notify a managed platform of the availability of a result and to provide communication of the result. In any manner, the central server may receive a notification of the virtual TPM's completion of processing (diamond 270). If the operation is not yet completed, diamond 270 loops back on itself. When the operation is completed, control passes to block 280, where the result is provided to the managed platform, e.g., in a secure manner back to the requesting platform. While shown with this particular implementation in the embodiment of FIG. 3, it is to be understood that the scope of the present invention is not limited in this regard.

Figure 4:
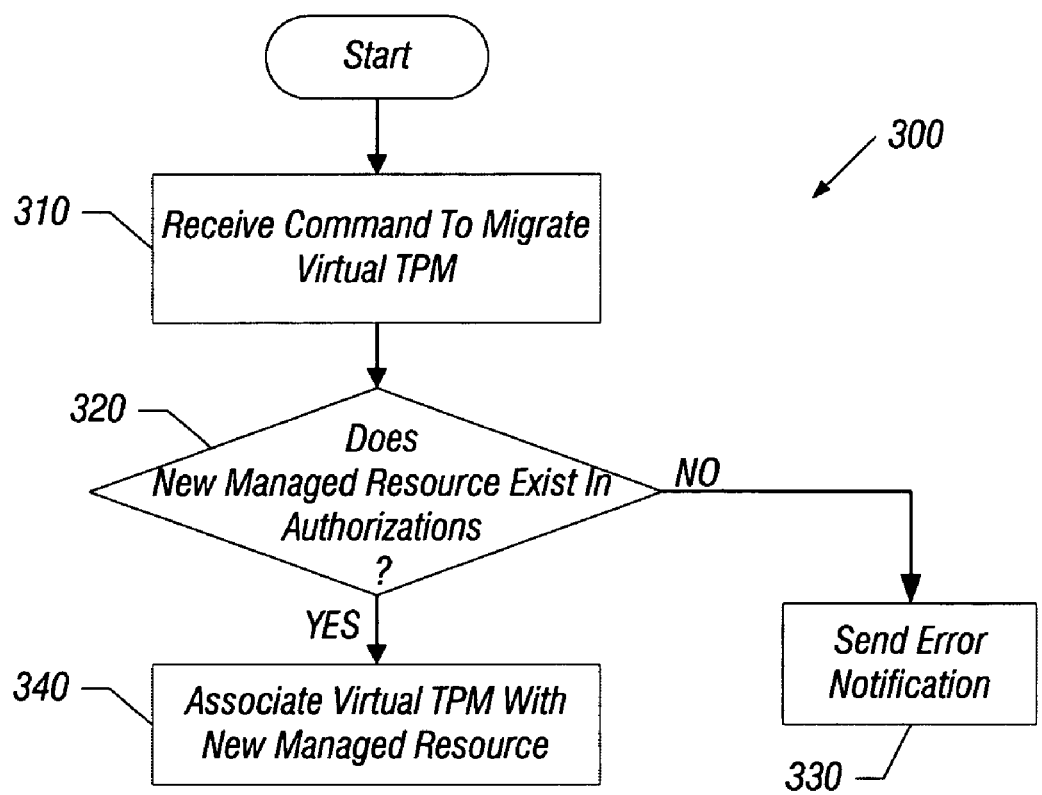
FIG. 4 is a flow diagram of a method of migrating a virtual security module in accordance with one embodiment of the present invention.

Referring now to FIG. 4, shown is a flow diagram of a method in accordance with one embodiment of the present invention. As shown in FIG. 4, method 300 may be used to migrate a virtual security module from a first managed resource to a second managed resource. Method 300 may begin by receiving a command to migrate a virtual TPM (block 310). As an example, such a command may be received from a platform center manager coupled to a TPM server. This manager may be responsible for monitoring operating conditions of a network, and it may initiate such a command to enable better load balancing between various managed resources.

Still referring to FIG. 4, control passes from block 310 to diamond 320. There, it may be determined if the new managed resource (i.e., identified by the command) exists in a list of authorizations (diamond 320). For example, the TPM server may include a list of authenticated platforms present in the network. Also, either as part of that list or as a separate list, the TPM server may maintain a list of authorized vTPM's and their properties, including various keys and other security features.

If it is determined at diamond 320 that the managed resource to which a vTPM is to be migrated is not authorized, control passes to block 330. There, an error notification may be sent (block 330). For example, a message may be sent back to the platform center manager. In some implementations, the platform center manager may instruct the TPM server to authorize the new managed resource to later enable it to have a vTPM migrated to it. Still with reference to FIG. 4 if at diamond 320 it is determined that the new managed resource exists in a list of authorizations, control passes to block 340. There, the identified vTPM may be associated with the new managed resource (block 340). For example, an association table listing vTPM's and their associated platforms may be updated to associate the vTPM with the new managed resource, or a logical binding may be updated accordingly. Of course, other manners of associating a vTPM with a given managed resource may be realized. Still further, in other embodiments a virtual TPM may be migrated from a first TPM server to a second TPM server, e.g., under command of a platform center manager. To effect such transfer, all keys and other secure information of the virtual TPM may be encrypted prior to transfer.

Figure 5:
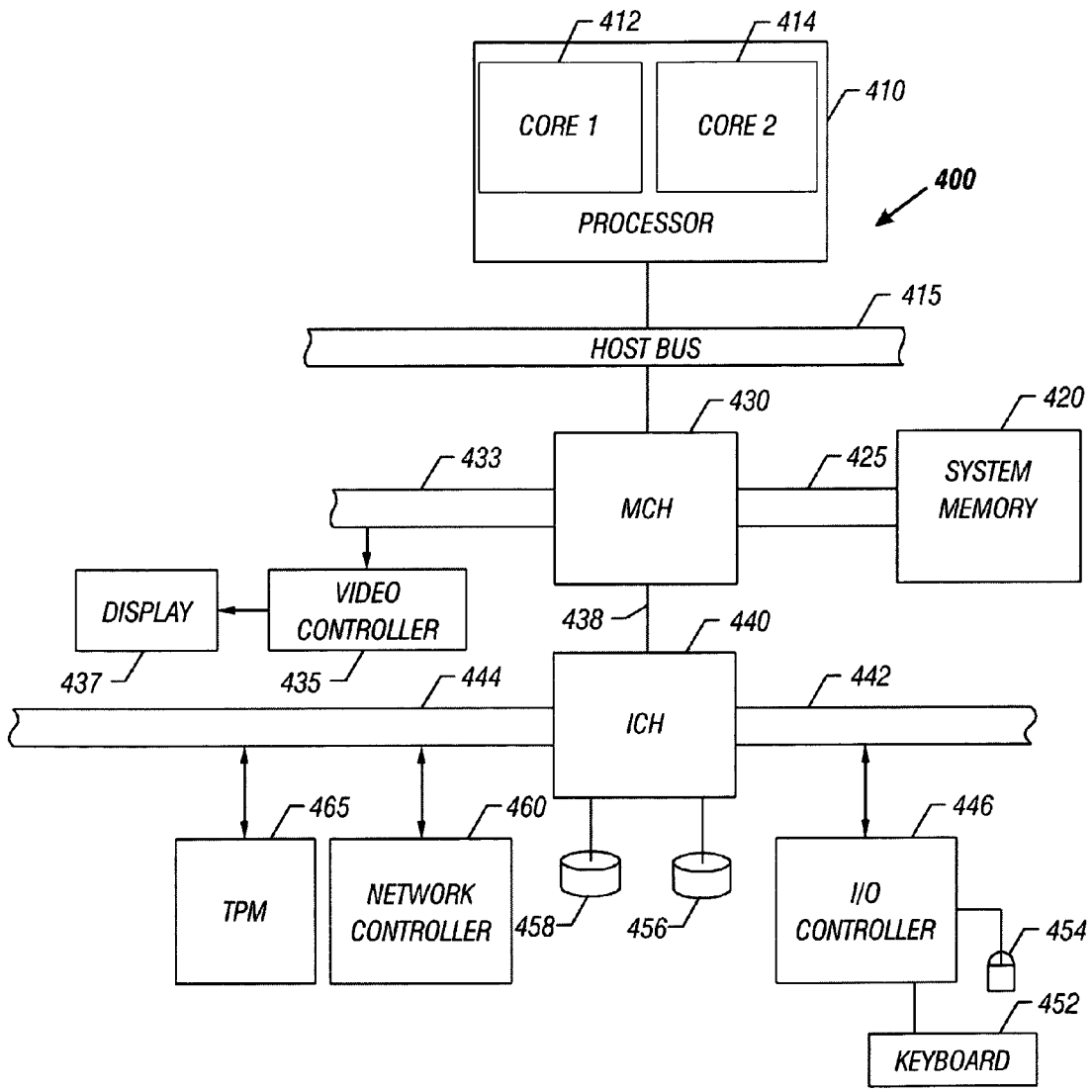
FIG. 5 is a block diagram of a system in accordance with one embodiment of the present invention.

FIG. 5 is a block diagram of a computer system 400 that may implement multi-context virtual TPMs in accordance with an embodiment of the invention. As used herein, the term "computer system" may refer to any type of processor-based system, such as a server computer, a blade computer, a desktop computer or the like. In one embodiment, computer system 400 includes a processor 410, which may be a multicore processor including a first core 412 and a second core 414. Processor 410 may be coupled over a host bus 415 to a memory controller hub (MCH) 430 in one embodiment, which may be coupled to a system memory 420 (e.g., a dynamic random access memory (DRAM)) via a memory bus 425. MCH 430 may also be coupled over a bus 433 to a video controller 435, which may be coupled to a display 437.

MCH 430 may also be coupled (e.g., via a hub link 438) to an input/output (I/O) controller hub (ICH) 440 that is coupled to a first bus 442 and a second bus 444. First bus 442 may be coupled to an I/O controller 446 that controls access to one or more I/O devices. As shown in FIG. 5, these devices may include in one embodiment input devices, such as a keyboard 452 and a mouse 454. ICH 440 may also be coupled to, for example, multiple hard disk drives 456 and 458, as shown in FIG. 5. Such drives may be two drives of a redundant array of individual disks (RAID) subsystem, for example. It is to be understood that other storage media and components may also be included in the system. Second bus 444 may also be coupled to various components including, for example, a network controller 460 that is coupled to a network port (not shown).

As further shown, a TPM 465, which may be a security coprocessor in accordance with an embodiment of the present invention, may further be coupled to second bus 444. In such embodiments, TPM 465 may provide the hardware to implement multiple vTPMs for use with managed resources coupled to system 400.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

creating an instance of a virtual trusted platform module (TPM) in a manager platform corresponding to a first server including TPM hardware, the manager platform a central repository of TPM services for a plurality of managed platforms coupled to the manager platform;

associating the instance of the virtual TPM with a first one of the managed platforms coupled to the manager platform, the managed platforms each a server including platform resources, a plurality of virtual machines and a platform manager, wherein the virtual TPM instance remains on the manager platform when the virtual TPM instance performs secure operations for the first managed platform and private keys of the virtual TPM instance remain on the manager platform and are not accessible to the first managed platform; and updating the virtual TPM instance from the first managed platform to a second managed platform based on load information, and without re-authenticating the virtual TPM instance.

2. The method of claim 1, further comprising authenticating the first managed platform before associating the instance of the virtual TPM with the first managed platform.

3. The method of claim 2, wherein authenticating the first managed platform comprises establishing a secure channel between the first managed platform and the manager platform.

4. The method of claim 1, further comprising maintaining an instance of the virtual TPM on the manager platform for each of the plurality of managed platforms.

5. The method of claim 1, further comprising receiving a request for a secure operation destined to the instance of the virtual TPM from the first managed platform, wherein the first managed platform has insufficient resources to perform the secure operation.

6. The method of claim 5, further comprising handling the request on the manager platform.

7. The method of claim 5, further comprising handling the request on the instance of the virtual TPM on the manager platform.

8. An apparatus comprising:
a manager device to create instances of a virtual trusted platform module (TPM) and associate each of the instances with corresponding managed platforms coupled to the manager device, wherein the virtual TPM instances remain on the manager device while the virtual TPM instances perform a secure operation for the corresponding managed platforms and are to be maintained by the manager device, the manager device comprising a server of a server center including at least one hardware TPM, and the managed platforms comprise other servers of the server center, wherein the manager device is to change association of an instance of a virtual TPM from a first managed platform to a second managed platform based on load information, wherein the instance is maintained on the manager device, by update to an association table that lists the virtual TPM instances and corresponding managed platforms and without re-authentication of the instance.

9. The apparatus of claim 8, further comprising secure channels to couple the managed platforms to the manager device.

10. The apparatus of claim 8, further comprising a platform center manager coupled to the manager device to manage the managed platforms.

11. The apparatus of claim 8, wherein the corresponding instance of the virtual TPM is to process a request for a secure operation from a managed platform.

12. The apparatus of claim 11, wherein the corresponding instance of the virtual TPM is to transmit the request to the manager device for processing.

13. An article comprising a non-transitory machine-accessible storage medium including instructions that when executed cause a system to:
instantiate a first virtual security coprocessor in a central location corresponding to a first server;
associate the first virtual security coprocessor with a first managed platform corresponding to a second server coupled to the central location responsive to a request from the first managed platform, wherein the first virtual security coprocessor is to remain in the central location; and
update association of the first virtual security coprocessor to a second managed platform corresponding to a third server coupled to the central location responsive to a management command from a platform manager based on load information via update to an association table that lists virtual security coprocessor instances and corresponding managed platforms to associate the first virtual security coprocessor with the second managed platform without re-authentication of the first virtual security coprocessor, wherein the first virtual security coprocessor is to remain in the central location after the update.

14. The article of claim 13, further comprising instructions that when executed cause the system to receive a request for a secure operation from the first managed platform and perform the secure operation using the first virtual security coprocessor in the central location.

15. The article of claim 14, further comprising instructions that when executed cause the system to perform the secure operation using the central location responsive to a request from the first virtual security coprocessor.

16. The article of claim 13, further comprising instructions that when executed cause the system to instantiate a plurality of virtual security coprocessors in the central location and to associate each of the plurality of virtual security coprocessors with a corresponding one of a plurality of managed platforms coupled to the central location.

17. A system comprising:
a plurality of managed platforms each a server having at least one hardware resource to be used in a virtualized environment;
a management platform having a hardware trusted platform module (TPM) and corresponding to a TPM server coupled to the plurality of managed platforms to create instances of a virtual security module and associate each of the instances with a corresponding one of the plurality of managed platforms, wherein the management platform is to maintain the instances of the virtual security module on the management platform while the virtual security module instances perform a secure operation for the corresponding managed platform and private keys of the virtual security module instances remain on the management platform and are not accessible to the corresponding managed platforms during the secure operation; and
a platform manager coupled to the management platform, when the platform manager is to instruct the management platform to migrate an instance of the virtual security module from a first managed platform to a second managed platform based on load information without re-authorization activities, wherein the instance is maintained on the management platform.

18. The system of claim 17, wherein the management platform is to transmit a request for a secure operation received from one of the plurality of managed platforms to the corresponding instance of the virtual security module for processing.

19. The method of claim 5, wherein the first managed platform performs at least one attestation operation using a TPM hardware of the first managed platform, prior to sending the request for the secure operation to the managed platform.

20. The apparatus of claim 8, wherein the manager device is to determine if the second managed platform is present on a list of an authenticated platforms, and if not to prevent the update.

21. The apparatus of claim 20, wherein the manager device is to report a notification to the platform center manager regarding the prevention, and responsive to an instruction from the platform center manager, authorize the second managed platform to enable a virtual TPM migration thereto.

22. The method of claim 1, further comprising updating association of the instance of the virtual TPM from the first managed platform to the second managed platform, wherein the instance is maintained on the manager platform, by update to an association table that lists the virtual TPM instances and corresponding managed platforms.

23. The system of claim 17, wherein the migration is via update to an association table that lists virtual security module instances and corresponding managed platforms.

\* \* \* \* \*